(12) United States Patent
Prestl et al.

(10) Patent No.: US 6,256,574 B1
(45) Date of Patent: Jul. 3, 2001

(54) DISTANCE-RELATED CRUISE CONTROL SYSTEM

(75) Inventors: Willibald Prestl, Eichenau; Joachim Steinle; Oliver Tschernoster, both of Munich, all of (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 09/245,723

(22) Filed: Feb. 8, 1999

(30) Foreign Application Priority Data

Feb. 6, 1998 (DE) ............................. 198 04 641

(51) Int. Cl.$^7$ .............................. G06F 17/00; G06F 7/00
(52) U.S. Cl. ........................... 701/96; 701/93; 701/301; 340/903; 340/435; 340/436; 180/170; 180/271; 342/70
(58) Field of Search ................... 701/96, 93, 23, 701/24, 301, 70; 180/167, 168, 169, 170, 271, 274, 275, 282; 340/436, 901, 903, 435, 467; 342/70, 71

(56) References Cited

U.S. PATENT DOCUMENTS

| | | | |
|---|---|---|---|
| 4,097,864 | 6/1978 | Endo et al. | 343/7 |
| 5,014,200 | * 5/1991 | Chundrlik et al. | 701/96 |
| 5,173,859 | * 12/1992 | Deering | 701/70 |
| 5,230,400 | 7/1993 | Kakinami et al. | 180/169 |
| 5,529,139 | * 6/1996 | Kurahashi et al. | 180/169 |

FOREIGN PATENT DOCUMENTS

| | | |
|---|---|---|
| 44 07 082 | 9/1994 | (DE) . |
| 195 44 923 | 6/1996 | (DE) . |
| 196 24 615 | 1/1998 | (DE) . |
| 197 29 613 | 1/1998 | (DE) . |

OTHER PUBLICATIONS

Japanese Abstract No. 07–132757, May 23, 1995.
Japanese Abstract No. 09–324666, Dec. 12, 1997.

* cited by examiner

Primary Examiner—William A. Cuchlinski, Jr.
Assistant Examiner—Yonel Beaulieu
(74) Attorney, Agent, or Firm—Crowell & Moring, L.L.P.

(57) ABSTRACT

A distance-related cruise control system for motor vehicles has an electronic control unit, by which in the event of a distance-controlled following travel with a defined following distance from a vehicle driving ahead, when the speed of the vehicle falls below a defined first threshold, in the event of a further decrease of the speed of the vehicle driving ahead, the deceleration capability is reduced independently of the maintenance of the following distance. Preferably, the momentarily defined following distance is first increased when the speed falls below a defined second threshold which is larger than the first threshold.

8 Claims, 1 Drawing Sheet

DISTANCE-RELATED CRUISE CONTROL SYSTEM

BACKGROUND AND SUMMARY OF THE INVENTION

This application claims the priority of German Application No. 198 04 641.3, filed Feb. 6, 1998, the disclosure of which is expressly incorporated by reference herein.

The invention relates to a distance-related cruise control system and, more particularly, to a distance-related cruise control system for motor vehicles having an electronic control unit.

A cruise control system of this type is known, for example, from U.S. Pat. No. 5,014,200. Known adaptive cruise control systems of this type, in particular, consist essentially of two components:

1. a cruise controller which basically maintains a speed defined by the driver constant; and
2. a sensor system for sensing the distance to the respective vehicle driving ahead.

In the case of distance-related adaptive cruise control systems, a defined speed is basically kept constant until a defined minimum distance is achieved to the vehicle driving ahead, or until there is a falling below that defined minimum distance. When this defined minimum distance is reached or when there is a falling below this defined minimum distance, a cruise control operation takes place such that the defined minimum distance (following distance) is maintained in the form of a distance-controlled following drive.

Furthermore, distance-related cruise control systems are known which comprise an automatically distance-controlled stopping action to a complete stop behind vehicles driving ahead. In this case, an increased deceleration capability is permitted with decreasing speed values. In the following, the term "deceleration capability" signifies the maximal deceleration required by the cruise control system. However, not all vehicles can reliably keep a vehicle stopped, which was automatically stopped in this manner, by means of an automatically acting brake system. Safety-critical situations may occur in this case when a driver leaves an automatically stopped vehicle without operating a manual braking device. An automatic stopping to a complete stop may also lead a driver to assume that the adaptive cruise control system, even in critical situations as the result of braking interventions, always offers a sufficient and fully automatic aid. However, such distance-related adaptive cruise control systems should be understood as comfort systems, in which the driver should remain completely responsible as the monitoring party.

It is therefore an object of the invention to improve a distance-related cruise control system such that the driver is always aware of the operating limits of the system, and that he can experience the operating limits particularly in danger-free situations.

This object is achieved by a distance-related cruise control system for motor vehicles having an electronic control unit. By means of the control unit, in the event of a distance-controlled following travel with a defined following distance from the vehicle driving ahead, when the speed falls below a defined first threshold, in the event of a further decrease of the speed of the vehicle driving ahead, the deceleration capability is reduced independently of a maintaining of a following distance. An advantageous further development of the invention is described herein.

In contrast to the conventional approach of increasing the deceleration capability with decreasing speed values, the deceleration capability, which is normally implemented by the connection of the cruise control system with an actively controllable braking system, starting with a defined low speed value, is preferably continuously reduced to zero or to the engine drag moment with a further decreasing speed. The reduction of the deceleration capability forces the driver to intuitively take over the driving of the vehicle at low speeds.

In order for the taking-over of the driving of the vehicle to occur in time and in uncritical driving situations, preferably before initiating the reduction of the deceleration capability, the defined following distance is first increased. Preferably, the increase of the following distance takes place at an increasing negative relative speed with respect to the vehicle driving ahead.

By ensuring that the driver is fully responsible for driving the vehicle, safety is increased by means of the cruise control system according to the invention.

Other objects, advantages and novel features of the present invention will become apparent from the following detailed description of the invention when considered in conjunction with the accompanying drawings.

DETAILED DESCRIPTION OF THE DRAWINGS

Figure 1:
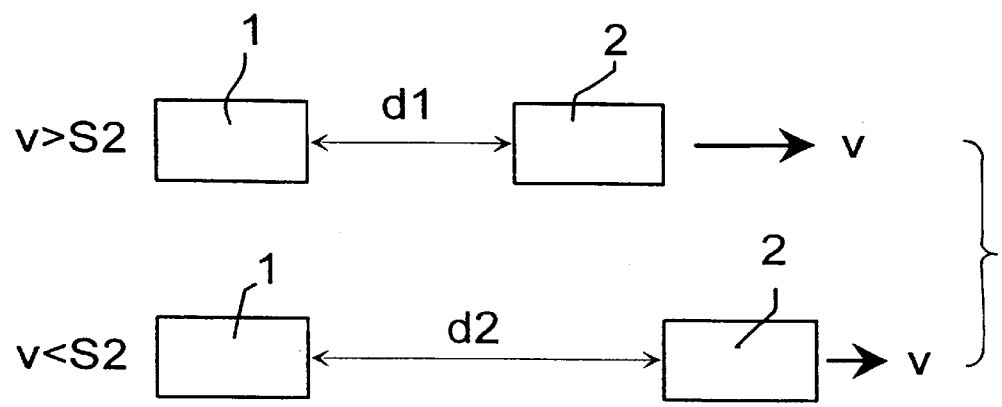
FIG. 1 is a schematic representation of different indications of the following distance as a function of the vehicle speed.

FIG. 1 schematically illustrates a distance-related following travel of a vehicle 1 having a cruise control system according to the invention. The vehicle 1 is behind a vehicle 2 driving ahead in the direction of the arrow. In each case, the vehicle 2 moves at a speed v in the direction indicated by the arrows. The upper representation of FIG. 1 shows a following travel at a defined following distance d1 for a first and normal case when the speed v is higher than a defined threshold S2. The lower representation of FIG. 1 shows a following travel for the second case, in which the speed v of the vehicle 2 driving ahead has fallen below the threshold S2, such as a typical inner-city traffic speed. From the point in time at which the speed v falls below the threshold S2, the following distance d1 is at first continuously enlarged, particularly with the goal of reaching the increased following distance d2, if possible, before there is a falling below the threshold S1 (FIG. 2).

If, because vehicle 2 is slowing down, the vehicle speed v falls below the threshold S1 (FIG. 2) (which is below the threshold S2), then the distance-controlled following travel is switched off. This occurs in that, independently of the following distance, the deceleration capability is reduced as vehicle 2's speed v continues to decrease—even if the increased following distance d2 had not yet been reached. As a result, the driver is increasingly reminded that he must take over the braking control of the vehicle.

Figure 2:
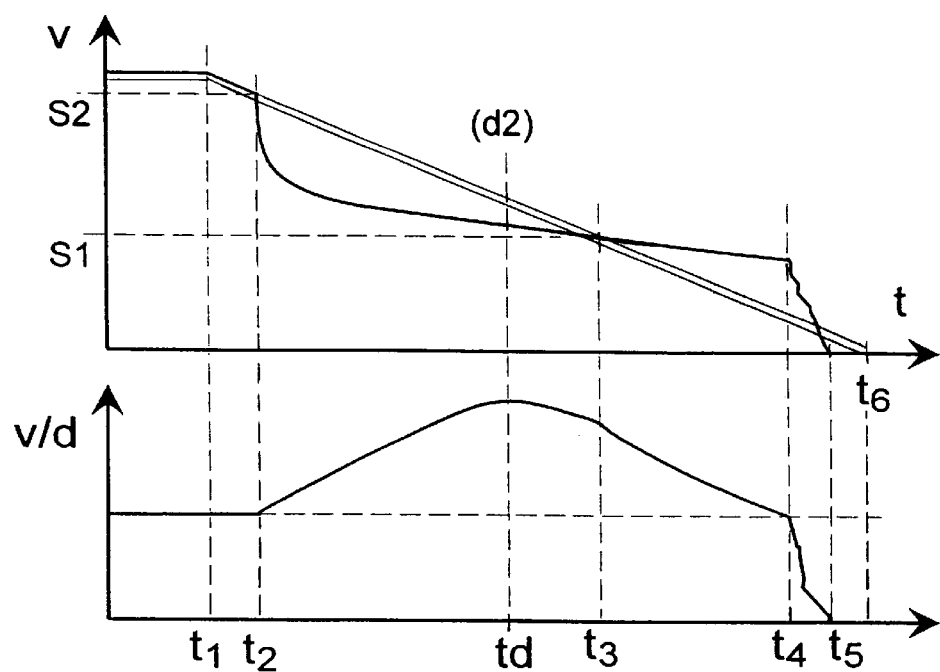
FIG. 2 is a graphical view of the course and of the time gap to the vehicle driving ahead at a reduced deceleration capability in comparison with the course of the speed and of the time gap when the deceleration capability is not reduced.

In FIG. 2 (top), the course of the vehicle speed v is given with respect to time t. FIG. 2 (bottom) shows the time gap v/d with respect to the vehicle 2 driving ahead in the manner of the ratio of the momentary speed v (of vehicle 2) to the momentary following distance d, with respect to time t. At the point in time t1, the vehicle speed v of the vehicle moving ahead (vehicle 2) starts to decrease and therefore the vehicle 1 which follows starts to decrease. As indicated by the thin line, in the case of a prior art system, if the vehicle driving ahead continuously slows down to a stop, then the speed v of the following vehicle would also continuously decrease to a stop with a constant time gap v/d.

However, according to the invention, at the point in time t2, when the speed v of vehicle 2 falls below the defined threshold S2, the following distance d1 is at first enlarged to the following distance d2 which, in the illustrated example, is reached at the point in time td; that is, the speed v of vehicle 1 momentarily decreases more than in the prior art or, within the scope of the defined deceleration capability, the momentary deceleration will be more. The time gap v/d increases simultaneously and reaches its maximum at the point in time td.

After the point in time td, the speed v of vehicle 2 continues to decrease and falls under the defined threshold S1 at the point in time t3. Subsequently, the deceleration capability is reduced, for example, by reducing the braking interventions, with a further decreasing speed v. In the example according to FIG. 2, this means that the speed v of vehicle 1 continuously decreases less intensively between the points in time t3 and t4. From the point in time t3, when the time gap v/d becomes noticeably smaller again, the driver recognizes in accordance with the desired effect of the invention that now the operating limits of the cruise control system are reached since the following distance again becomes smaller due to the reduction of the speed decrease, and that the driver must therefore soon intervene or take over. In the illustrated example, the driver takes over the driving of the vehicle 1 at the point in time t4 and is stopped in time at the point in time t5 by his own braking intervention. The vehicle 2 driving ahead comes to a stop at the point in time t6.

It is also pointed out that, in practice, there may also be a falling below the threshold S1 before the increased following distance d2 is reached. In this case, the deceleration capability will be reduced according to the invention, preferably independently of the reaching of this following distance d2. Otherwise, the reaching of the increased following distance d2 and/or the falling below the threshold S1 could also be defined as a triggering criterion for reducing the deceleration capability.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A distance-related cruise control system having a maximal deceleration limit for a first motor vehicle, comprising:
    an electronic control unit which includes a first means for, in an event of a distance-controlled following travel with a defined following distance from a second vehicle driving ahead, reducing the maximal deceleration limit of the first vehicle independently of maintaining said defined following distance when a speed of the second vehicle ahead falls below a first defined threshold (S1) in an event of a further decrease below said first defined following distance of the speed of the vehicle driving ahead.

2. The distance-related cruise control system according to claim 1, wherein a momentarily defined following distance is first increased when the speed of the vehicle driving ahead falls below a second defined threshold (S2) which is larger than the first defined threshold (S1).

3. A method of operating a distance-related cruise control system for a motor vehicle having an electronic control unit, the method comprising the acts of:
    monitoring a speed of a vehicle driving ahead of the motor vehicle; and
    enlarging a following distance between the vehicles when the speed of the vehicle driving ahead falls below a defined second threshold.

4. The method according to claim 3, further comprising the act of reducing a deceleration capability of the motor vehicle independently of the following distance when the speed of the vehicle driving ahead falls below a defined first threshold, said second threshold being larger than said first threshold.

5. A cruise control system for a motor vehicle, comprising:
    an electronic control unit appropriately programmed to:
        monitor a speed of a vehicle driving ahead of the motor vehicle; and
        enlarge a following distance between the vehicles when the speed of the vehicle driving ahead falls below a defined second threshold.

6. The cruise control system according to claim 5, wherein the electronic control unit is further programmed to reduce a a maximal deceleration limit of the motor vehicle independently of the following distance when the speed of the vehicle driving ahead falls below a defined first threshold, said second threshold being larger than said first threshold.

7. A computer product, comprising:
    a computer readable medium operable in an electronic control unit, said computer readable medium having stored thereon program code segments that:
    monitor a speed of a vehicle driving ahead of the motor vehicle; and
    enlarge a following distance between the vehicles when the speed of the vehicle driving ahead falls below a defined second threshold.

8. The computer product according to claim 7, wherein the computer readable medium further comprises a program code segment that reduces a a maximal deceleration limit of the motor vehicle independently of the following distance when the speed of the vehicle driving ahead falls below a defined first threshold, said second threshold being larger than said first threshold.

* * * * *